United States Patent
Park

(10) Patent No.: US 10,305,304 B2
(45) Date of Patent: May 28, 2019

(54) CLOUD SERVER, VEHICLE, AND METHOD FOR CONTROLLING THE VEHICLE

(71) Applicants: Hyundai Motor Company, Seoul (KR); Kia Motors Corporation, Seoul (KR)

(72) Inventor: Yunjoong Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/965,151

(22) Filed: Apr. 27, 2018

(65) Prior Publication Data

US 2019/0131809 A1    May 2, 2019

(30) Foreign Application Priority Data

Oct. 30, 2017   (KR) .................. 10-2017-0142012

(51) Int. Cl.
*G07C 5/08* (2006.01)
*H02J 7/00* (2006.01)

(52) U.S. Cl.
CPC .............. *H02J 7/0047* (2013.01); *G07C 5/08* (2013.01)

(58) Field of Classification Search
None
See application file for complete search history.

(56) References Cited

U.S. PATENT DOCUMENTS 9,066,298 B2   6/2015   Pandya et al.
9,238,410 B2   1/2016   Nakagawa

OTHER PUBLICATIONS

"Chevrolet Offers OnStar Proactive Alerts Diagnostics", Telematics News, May 9, 2016.

*Primary Examiner* — Thomas S McCormack
(74) *Attorney, Agent, or Firm* — Mintz Levin Cohn Ferris Glovsky and Popeo, P.C.; Peter F. Corless

(57) ABSTRACT

Disclosed herein are a cloud server, vehicle, and method for controlling the vehicle. The vehicle includes: a battery configured to supply power to the vehicle; a controller configured to transmit a danger-of-discharge signal to a cloud server when a danger-of-discharge condition of the battery is satisfied; a vehicle terminal configured to receive a danger-of-discharge reference value of the battery from the cloud server, and to transfer the danger-of-discharge reference value to the controller; and a battery sensor configured to sense a State-Of-Charge (SOC) of the battery, and to transmit a trigger signal for waking up the controller when the SOC of the battery is greater than or equal to the danger-of-discharge reference value of the battery.

24 Claims, 8 Drawing Sheets

CLOUD SERVER, VEHICLE, AND METHOD FOR CONTROLLING THE VEHICLE

CROSS-REFERENCE TO RELATED APPLICATION

This application claims the benefit of priority to Korean Patent Application No. 10-2017-0142012, filed on Oct. 30, 2017 in the Korean Intellectual Property Office, the disclosure of which is incorporated herein in its entirety by reference.

BACKGROUND

1. Technical Field

Embodiments of the present disclosure relate generally to a cloud server, a vehicle, and a method of controlling the vehicle, and more particularly, to a technique for sensing a State Of Charge (SOC) of a battery of a vehicle to enable the battery to transmit a danger-of-discharge signal.

2. Description of the Related Art

In most modern vehicles, a vehicle information providing module can provide the driver with various information indicating a state of the vehicle, such as battery life. A battery plays a key role in operating vehicles. For example, when the driver inserts a key into the vehicle's ignition and then rotates the key, the battery supplies power required for operating various electronic devices and a motor of the vehicle. When the vehicle starts, the battery drives a generator using the torque of an operating engine to produce electricity, and charges the remaining electricity therein.

If the ignition of the vehicle is turned off, power that is supplied from the vehicle battery to devices and accessories such as radio system is blocked. However, current continues to be supplied regardless of the ignition status so that when the vehicle again starts, it can enter ignition immediately, and simultaneously, electric loads can operate normally. This current is called dark current.

Currently, a wide array of electronic devices are installed in vehicles to take advantage of developing information technology. For example, a rear view camera receives power to continuously photograph the vehicle's surroundings even when the vehicle is parked after the ignition of the vehicle is turned off.

For this reason, dark current is essential for vehicles, but the life of the vehicle battery will be shortened if dark current is not limited, since the vehicle battery is a rechargeable battery. Accordingly, it is important to measure the voltage, current, and temperature of the battery (e.g., using a battery sensor), and to monitor a state of the battery according to the measurements.

SUMMARY

It is an aspect of the present disclosure to provide a technique for sensing a State Of Charge (SOC) of a battery of a vehicle, and waking up a controller if the SOC of the battery is equal to a danger-of-discharge reference value causing the battery to transmit a danger-of-discharge signal.

Additional aspects of the disclosure will be set forth in part in the description which follows and, in part, will be apparent from the description, or may be learned by practice of the disclosure.

In accordance with embodiments of the present disclosure, a vehicle includes: a battery configured to supply power to the vehicle; a controller configured to transmit a danger-of-discharge signal to a cloud server when a danger-of-discharge condition of the battery is satisfied; a vehicle terminal configured to receive a danger-of-discharge reference value of the battery from the cloud server, and to transfer the danger-of-discharge reference value to the controller; and a battery sensor configured to sense a State-Of-Charge (SOC) of the battery, and to transmit a trigger signal for waking up the controller when the SOC of the battery is greater than or equal to the danger-of-discharge reference value of the battery.

The controller may be turned off when the ignition of the vehicle is turned off, and the controller may wake up in response to receiving the trigger signal.

The controller may transmit the danger-of-discharge reference value of the battery received from the vehicle terminal to the battery sensor.

When the controller wakes up in response to receiving the trigger signal, the controller may determine whether to transmit the danger-of-discharge signal to the vehicle terminal based on the SOC of the battery sensed by the battery sensor.

The vehicle terminal may be turned off when the ignition of the vehicle is turned off, and the vehicle terminal may be turned on when the controller wakes up in response to receiving the trigger signal.

The vehicle terminal may transmit the danger-of-discharge signal to the cloud server after receiving the danger-of-discharge signal from the controller.

The vehicle terminal may store predetermined data relating to the danger-of-discharge condition of the battery.

When the predetermined data relating to the danger-of-discharge condition of the battery is different from the danger-of-discharge reference value of the battery, the vehicle terminal may transmit the danger-of-discharge reference value of the battery to the controller after receiving the danger-of-discharge reference value of the battery from the cloud server.

The vehicle may further include: a vehicle communication device configured to receive the danger-of-discharge reference value of the battery from the cloud server, and to transmit the danger-of-discharge signal to the cloud server after receiving the danger-of-discharge signal from the controller.

Furthermore, in accordance with embodiments of the present disclosure, a method of controlling a vehicle includes: sensing a State Of Charge (SOC) of a battery of the vehicle using a battery sensor; receiving a danger-of-discharge reference value of the battery at a vehicle terminal from a cloud server; transmitting a trigger signal from the battery sensor for waking up a controller when the SOC of the battery is greater than or equal to the danger-of-discharge reference value of the battery; and transmitting a danger-of-discharge signal from the controller to a cloud server when a danger-of-discharge condition of the battery is satisfied.

The method of controlling a vehicle may further include: turning off the controller when an ignition of the vehicle is turned off; and waking up the controller in response to receiving the trigger signal.

The receiving of the danger-of-discharge reference value of the battery from the cloud server may include: receiving the danger-of-discharge reference value of the battery at the vehicle terminal from the cloud server; and transmitting the danger-of-discharge reference value of the battery from the vehicle terminal to the controller.

The method of controlling a vehicle may further include: transmitting the danger-of-discharge reference value of the battery from the controller to the battery sensor after receiving the danger-of-discharge reference value of the battery from the vehicle terminal.

The transmitting of the danger-of-discharge signal of the battery to the cloud server may further include transmitting the danger-of-discharge signal from the cloud server to the vehicle terminal after receiving the danger-of-discharge signal from the controller.

The method of controlling a vehicle may further include: turning off the vehicle terminal when an ignition of the vehicle is turned off; and turning on the vehicle terminal when the controller wakes up in response to receiving the trigger signal.

The method of controlling a vehicle may further include: storing predetermined data relating to the danger-of-discharge condition of the battery.

The method of controlling a vehicle may further include: when the predetermined data relating to the danger-of-discharge condition of the battery is different from the danger-of-discharge reference value of the battery, transmitting the danger-of-discharge reference value of the battery to the controller after receiving the danger-of-discharge reference value of the battery from the cloud server.

Furthermore, in accordance with embodiments of the present disclosure, a cloud server includes: a server memory configured to store predetermined data indicating a danger-of-discharge reference value of a battery of a vehicle; a server communication device configured to receive a danger-of-discharge condition of the battery from a vehicle terminal; and a processor configured to compare predetermined data indicating a danger-of-discharge reference value of the battery with the danger-of-discharge condition of the battery received from the vehicle terminal, and to generate a control signal for transmitting the predetermined data indicating the danger-of-discharge reference value of the battery stored in the server memory to the vehicle terminal when the predetermined data indicating the danger-of-discharge reference value of the battery is different from the danger-of-discharge condition of the battery.

The server communication device may receive a danger-of-discharge signal from the vehicle terminal when the danger-of-discharge condition of the battery is satisfied.

The server communication device may receive predetermined data relating to the danger-of-discharge condition of the battery from a user terminal.

The processor may generate a control signal for warning of danger of discharge of the battery in response to the server communication device receiving a danger-of-discharge signal, and the server communication device transmits the control signal for warning of danger of discharge of the battery to the user terminal.

The processor may change the predetermined data indicating the danger-of-discharge reference value of the vehicle battery, and stores the changed data in the server memory.

The processor may change the predetermined data indicating the danger-of-discharge reference value of the battery based on a condition for changing the danger-of-discharge reference value of the battery, and the condition for changing the danger-of-discharge reference value of the vehicle battery may relate to at least one of: a region where the vehicle is located, weather of the region where the vehicle is located, a temperature of the region where the vehicle is located, a model of the vehicle, a kind of the battery, and a driving pattern of a driver who drives the vehicle.

In response to receiving a danger-of-discharge signal from the vehicle terminal more than a predetermined number of times, the processor may change the predetermined data indicating the danger-of-discharge reference value of the battery.

BRIEF DESCRIPTION OF THE DRAWINGS

These and/or other aspects of the disclosure will become apparent and more readily appreciated from the following description of the embodiments, taken in conjunction with the accompanying drawings of which.

Figure 1:
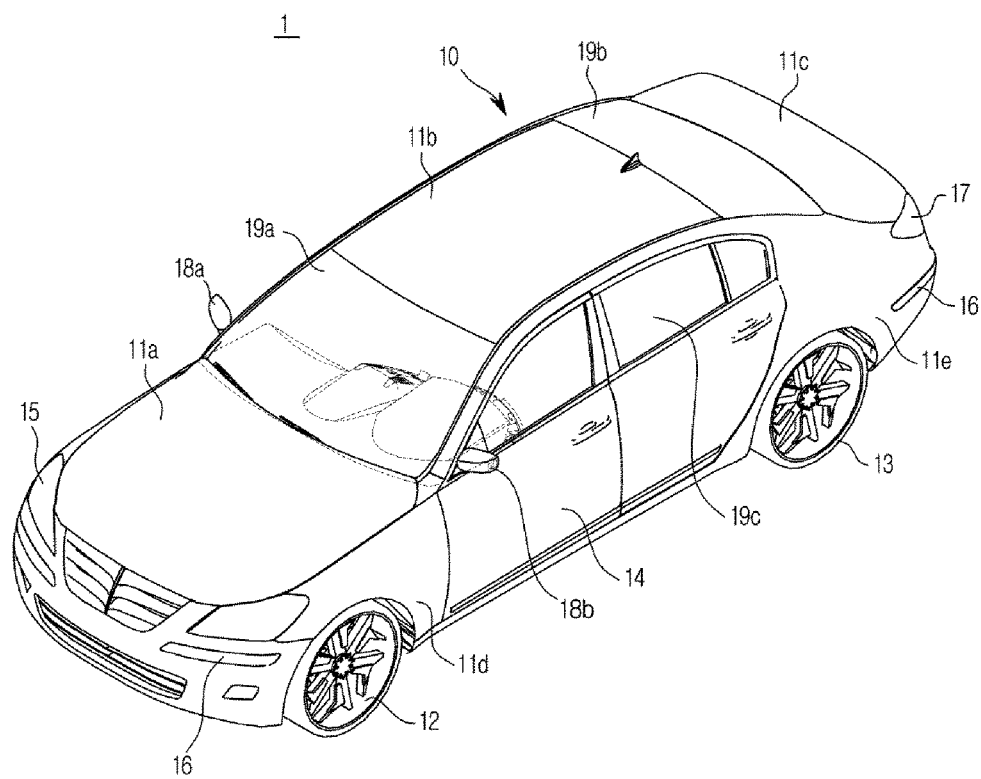
FIG. 1 is a perspective view schematically showing an outer appearance of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Advantages and features of the present disclosure and a method of achieving the advantages and features will be apparent by referring to embodiments described below in connection with the accompanying drawings. However, the present disclosure is not restricted by these embodiments but can be implemented in many different forms. The present embodiments are provided to complete the disclosure of the present invention and to allow those having ordinary skill in the art to understand the scope of the present disclosure. The present disclosure is defined by the category of the claims.

The terminology used herein is for the purpose of describing particular embodiments only and is not intended to be limiting of the disclosure.

It will be understood that when the terms "includes," "comprises," "including," and/or "comprising," when used in this specification, specify the presence of stated elements and/or components, but do not preclude the presence or addition of one or more elements and/or components thereof. As used herein, the terms "part", "module", or "unit" refers to a unit that can perform at least one function or operation, and may be implemented as a software or hardware component such as a Field Programmable Gate Array (FPGA) or an Application Specific Integrated Circuit (ASIC). However, the term "part", "module" or "unit" is not limited to software or hardware. The "part", "module", or "unit" may be configured in an addressable storage medium, or may be configured to run on at least one processor. Therefore, as an example, the "part", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and the "part", "module", or "unit" may be integrated into the smaller number of components and the "part", "module", or "unit", or may be sub-divided into additional components and an additional "part", "module", or "unit".

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the controller in conjunction with one or more other components, as would be appreciated by a person of ordinary skill in the art.

Hereinafter, embodiments of a cloud server, a vehicle, and a method of controlling the vehicle will be described in detail with reference to the accompanying drawings so that the present disclosure may be readily implemented by those skilled in the art. In the drawings, parts irrelevant to the description are omitted for the simplicity of explanation. Like reference numerals refer to like elements throughout this specification, and overlapping descriptions thereof will be omitted.

FIG. 1 is a perspective view schematically showing an outer appearance of a vehicle according to embodiments of the present disclosure.

As shown in FIG. 1, a vehicle 1 may include a body 10 forming an outer appearance of the vehicle 1, and a plurality of wheels 12 and 13 to move the vehicle 1.

As would be generally understood in the art, the body 10 of the vehicle 1 may include a hood 11a to protect various devices, such as an engine, a motor, a battery, and a transmission, required for driving the vehicle 1, a roof panel 11b forming the inside space of the vehicle 1, a trunk lid 11c to provide storage space, and front fenders 11d and quarter panels 11e provided at both sides of the vehicle 1. Also, a plurality of doors 15 hinge-coupled with the body 10 may be provided at both sides of the body 10.

A front window 19a to provide a front view of the vehicle 1 may be provided between the hood 11a and the roof panel 11b, and a rear window 19b to provide a back view of the vehicle 1 may be provided between the roof panel 11b and the trunk lid 11c. Also, a plurality of side windows 19c to provide side views of the vehicle 1 may be provided at the upper parts of the doors 15.

A plurality of headlamps 15 to irradiate light in a heading direction of the vehicle 1 may be provided at the front part of the vehicle 1.

Also, a plurality of turn signal lamps 16 to inform a movement direction of the vehicle 1 may be provided at the front and back parts of the vehicle 1.

The vehicle 1 may make the turn signal lamps 16 flickering to inform a movement direction. Also, a plurality of tail lamps 17 may be provided at the back part of the vehicle 1. The tail lamps 17 may inform a gear shifting state, a brake operation state, etc. of the vehicle 1.

Also, the exterior of the vehicle 1 may further include a plurality of side-view mirrors 18 and 19 to provide the driver with rear and side views of the vehicle 1.

It should be appreciated that the exterior of the vehicle 1, including components thereof, as illustrated in FIG. 1 and described above is provided merely for demonstration purposes, and should not be treated as limiting the scope of the disclosure thereto.

Figure 2:
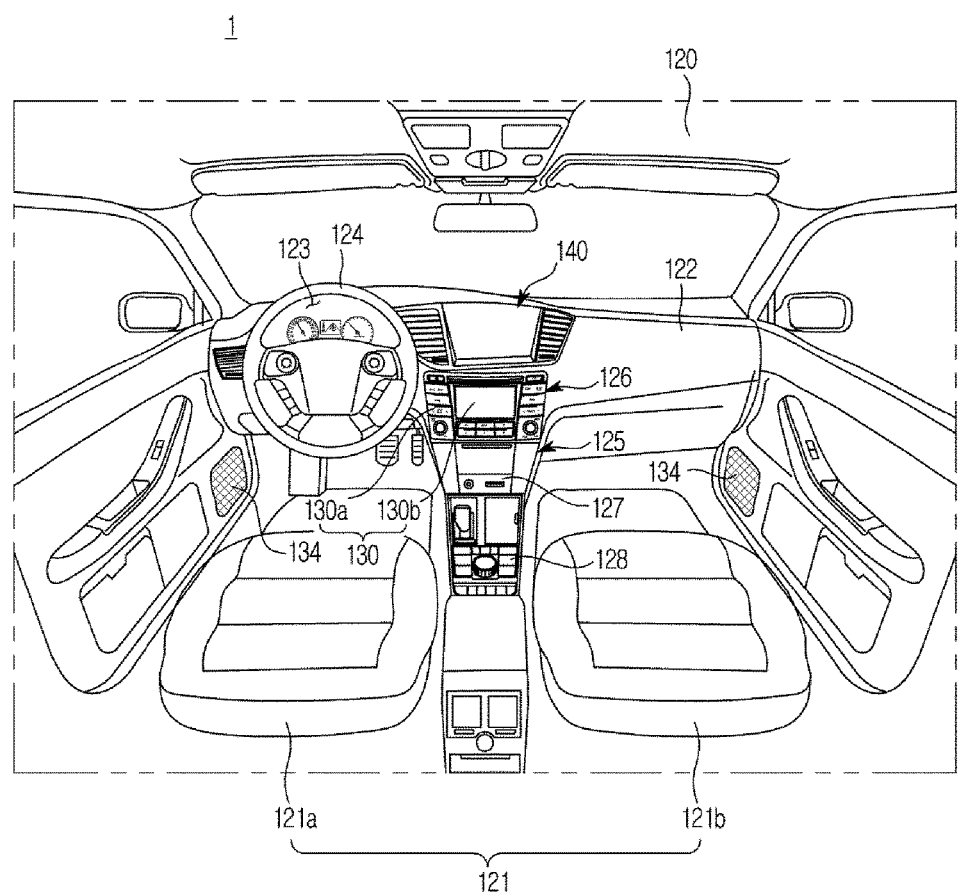
FIG. 2 shows the interior of the vehicle 1 according to embodiments of the present disclosure.

FIG. 2 shows the interior of the vehicle 1 according to embodiments of the present disclosure.

As shown in FIG. 2, an interior 120 of the body 10 may include: a plurality of seats 121 on which a driver and a passenger sit; a dashboard 122; an instrument panel (i.e., a cluster 123) which is disposed on the dashboard 122, and in which a tachometer, a speedometer, a coolant thermometer, a turn signal indicator light, a high beam indicator light, a warning light, a seatbelt warning light, an odometer, an automatic transmission shift lever indicator light, a door open warning light, an engine oil warning light, a low fuel warning light, etc. are installed; a steering wheel 124 to change a movement direction of the vehicle 1; and a center fascia 125 in which a vent and a control plate of an air conditioner and audio system are disposed.

The seats 121 may include a driver seat 121a on which a driver sits, a passenger seat 121b on which a passenger sits, and a back seat that is provided in the back part inside the vehicle 1.

The cluster 123 may be implemented in a digital fashion. That is, the cluster 123 implemented in the digital fashion may display information of the vehicle 1 and driving information as images, and display a Distance-To-Empty (DTE) of the vehicle 1 calculated based on a charged amount of the battery.

The center fascia 125 may be located in the dashboard 122 between the driver seat 121a and the passenger seat 121b.

The center fascia 125 may include a head unit 126 for controlling the air conditioner and a heater.

In the head unit 126, various buttons may be arranged to control the air conditioner and the heater.

In the inside of the head unit 126, a controller may be disposed to control the air conditioner and the heater.

The head unit 126 may include audio system 130 to perform a radio function. The audio system 130 may include an input device 130a to receive operation commands, and a display 130b to display operation information. The audio system 130 disposed in the vehicle 1 may be a head unit having a radio function, or an Audio Video Navigation (AVN) terminal which is a vehicle terminal 140 having a radio function.

The audio system 130 may receive broadcasting signals to output broadcasting. In FIG. 2, a case in which the audio system 130 is disposed in the center fascia 125 is shown as an example. Speakers 134 for receiving broadcasting signals from the audio system 130 to output broadcasting may be installed in the front doors of the vehicle 1. However, the locations of the speakers 134 shown in FIG. 2 are only an example, and the speakers 134 may be installed at any other locations in the inside of the vehicle 1.

The display 130b may display operation information of the air conditioner and the heater. Also, the display 130b may display an interface created in relation to operations of the vehicle 1, or an interface for a DTE of the vehicle 1.

In the center fascia 125, a vent, a cigar jack, etc. may be installed. Also, in the center fascia 125, a multi-terminal 127 to which an external device including a user's terminal (see 400 of FIG. 3) is connected in a wired fashion may be disposed.

That is, the multi-terminal 127 may enable wired communication between the head unit 126 or the vehicle terminal 140 and a user terminal 400.

Herein, the multi-terminal 127 may include a Universal Serial Bus (USB) port and an Auxiliary (AUX) terminal, and may further include a Secure Digital (SD) slot. The multi-terminal 127 may be disposed adjacent to the head unit 126, and also may be disposed adjacent to the vehicle terminal 140. The multi-terminal 127 may be electrically connected to the vehicle terminal 140 and an external device through a connector or a cable.

The external device may include a storage device, a user terminal, a MP3 player, etc., and the storage device may include card type memory or an external hard disk.

Also, the user terminal included in the external device may be a mobile communication terminal, and may include a smart phone, a laptop computer, a tablet, etc. The vehicle 1 may further include a manipulation portion 128 to receive operation commands for executing various functions.

The manipulation portion 128 may be disposed in the head unit 126 and the center fascia 125, and may include at least one physical button, such as on/off buttons for executing or stopping various functions, buttons for changing setting values of the various functions, etc. The manipulation portion 128 may transmit a signal generated when a button is manipulated to the controller in the head unit 126 or to the vehicle terminal 140.

That is, the manipulation portion 128 may receive a command for turning on or off the vehicle terminal 140, receive a selection of at least one of a plurality of functions, and transmit the selected function to the vehicle terminal 140.

For example, if a navigation function is selected, the manipulation portion 128 may receive information of a destination, and transmit the information of the destination to the vehicle terminal 140. Also, if a Digital Multimedia Broadcasting (DMB) function is selected, the manipulation portion 128 may receive information of a broadcasting channel and a volume, and transmit the information of the broadcasting channel and the volume to the vehicle terminal 140. Also, if a radio function is selected, the manipulation portion 128 may receive information of a radio channel and radio volume, and transmit the information of the radio channel and the radio volume to the vehicle terminal 140 or the display 130b.

The manipulation portion 128 may include a touch panel integrated into a display of the vehicle terminal 140. The manipulation portion 128 may be activated in the shape of buttons and displayed on the display of the vehicle terminal 140, and in this case, the manipulation portion 128 may receive position information of the displayed buttons.

The manipulation portion 128 may further include a jog dial (not shown) or a touch pad for receiving a command for moving or selecting a cursor displayed on the display of the vehicle terminal 140. The manipulation portion 128 may transmit a manipulation signal generated when the jog dial is manipulated or a touch signal generated when the touch pad is touched, to the vehicle terminal 140.

The jog dial or the touch pad may be disposed on the center fascia 125. The manipulation portion 128 may receive an automatic channel change command when the radio function is executed.

Also, a user may input a control command for changing a driving mode of the vehicle 1, or a control command for controlling individual components of the vehicle 1, through the manipulation portion 128.

The display 130b may display operation information of the head unit 126, and display information received through the manipulation portion 128.

For example, when the radio function is selected, the display 130b may display information of a radio channel and radio volume input by a user.

When the radio function is executed, the display 130b may display input information of an automatic channel change command, and execution information of an automatic channel change.

The vehicle terminal 140 may be mounted on the dashboard 122.

The vehicle terminal 140 may perform an audio function, a video function, a navigation function, a DMB function, a radio function, and a Global Positioning System (GPS) function.

Also, the vehicle terminal 140 may perform a function of collecting and transmitting information relating to an operation and state of the vehicle 1. According to an embodiment of the present disclosure, the vehicle terminal 140 may store predetermined data relating to a danger-of-discharge condition of the battery, and receive a danger-of-discharge reference value of the battery of the vehicle 1 from a cloud server.

The chassis of the vehicle 1 may include a power generation system, a power transfer system, a driving system, a steering system, a brake system, a suspension system, a transmission system, a fuel system, the front, rear, left, and right wheels 12 and 13, etc.

Also, the vehicle 1 may include various safety systems to secure a driver and passengers' safety.

The safety systems may include an airbag system to secure a driver and passengers' safety upon collision, and an Electronic Stability Control (ESC) system to avoid loss of control of the vehicle 1 when the vehicle 1 accelerates or corners.

Also, the vehicle 1 may further include various sensors, such as a proximity sensor to sense an obstacle or another vehicle in the rear or side of the vehicle 1, a rain sensor to determine whether it rains and to sense an amount of rainfall, a wheel speed sensor to sense the speed of the front, rear, left, and right wheels 12 and 13, an acceleration sensor to sense the acceleration of the vehicle 1, and an angular velocity sensor to sense a steering angle of the vehicle 1.

The vehicle 1 may include an Electronic Control Unit (ECU) to control the driving of the power generation system, the power transfer system, the driving system, the steering system, the brake system, the suspension system, the transmission system, the fuel system, the various safety systems, and the sensors.

Also, the vehicle 1 may optionally include electronic apparatuses, such as a hands-free system to improve a driver's convenience, a Bluetooth device, a rear camera, and a charging apparatus for the user terminal 400, and a High-pass apparatus.

The vehicle 1 may further include a start button to input an operation command to a start motor (not shown).

That is, when the start button is turned on, the vehicle 1 may operate the start motor (not shown), and drive an engine (not shown) which is a power generating apparatus by operating the start motor.

The vehicle 1 may include a battery (see 220 of FIG. 3) electrically connected to the vehicle terminal 140, the audio system, the indoor lamp, the start motor, and the other electronic devices to supply driving power to them.

Also, the vehicle 1 may further include a vehicle communication device (see 150 of FIG. 3) for communication between various electronic devices installed therein and for communication with the user terminal 400 which is an external terminal.

The vehicle communication device 150 may include a Controller Area Network (CAN) communication module, a Wireless-Fidelity (Wi-Fi) communication module, a USB communication module, and a Bluetooth communication module. Also, the vehicle communication device 150 may further include a broadcasting communication module, such as Transport Protocol Expert Group (TPEG) of DMB, SXM, and Radio Data System (RDS).

Figure 3:
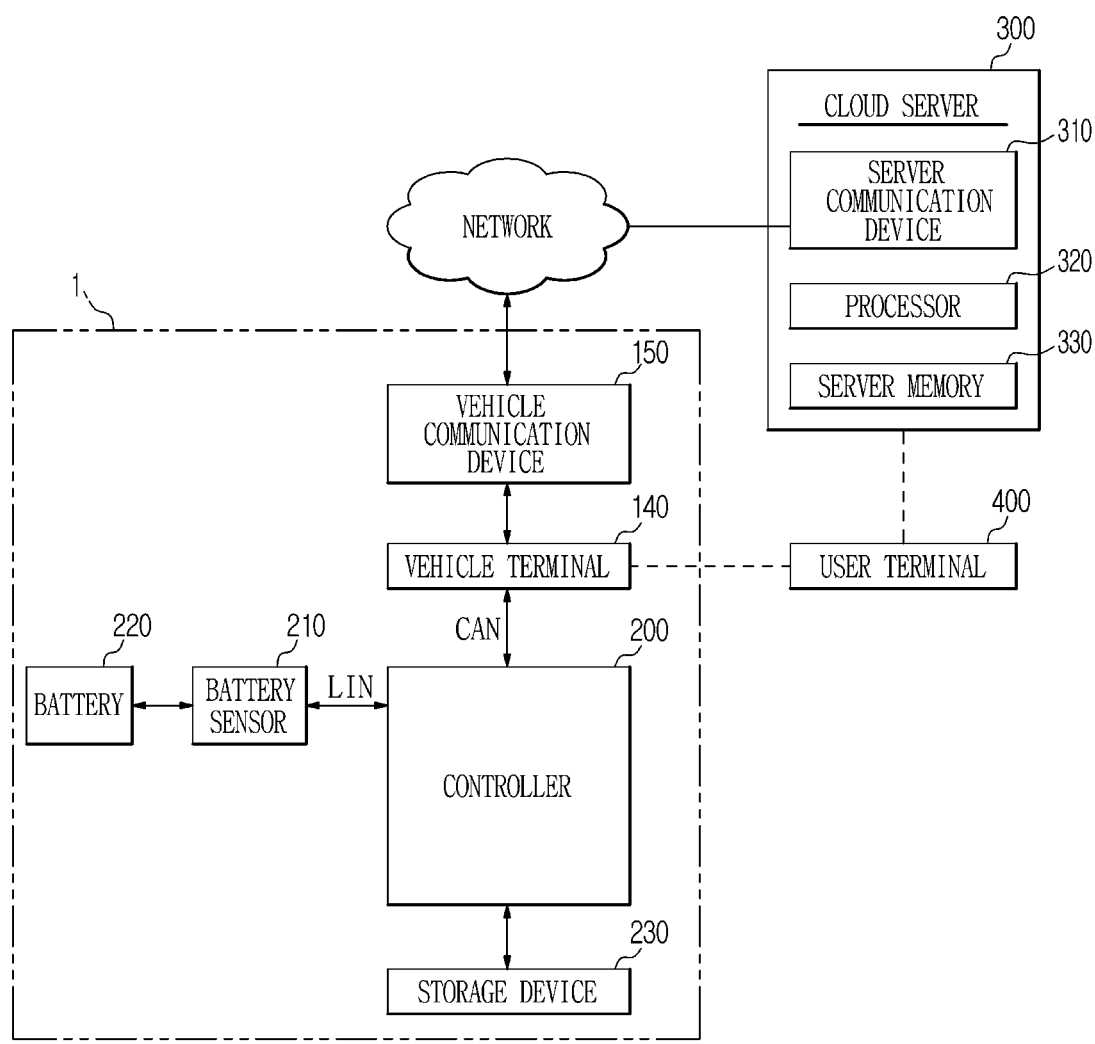
FIG. 3 is a control block diagram of a vehicle and a cloud server according to embodiments of the present disclosure.
Figure 4:
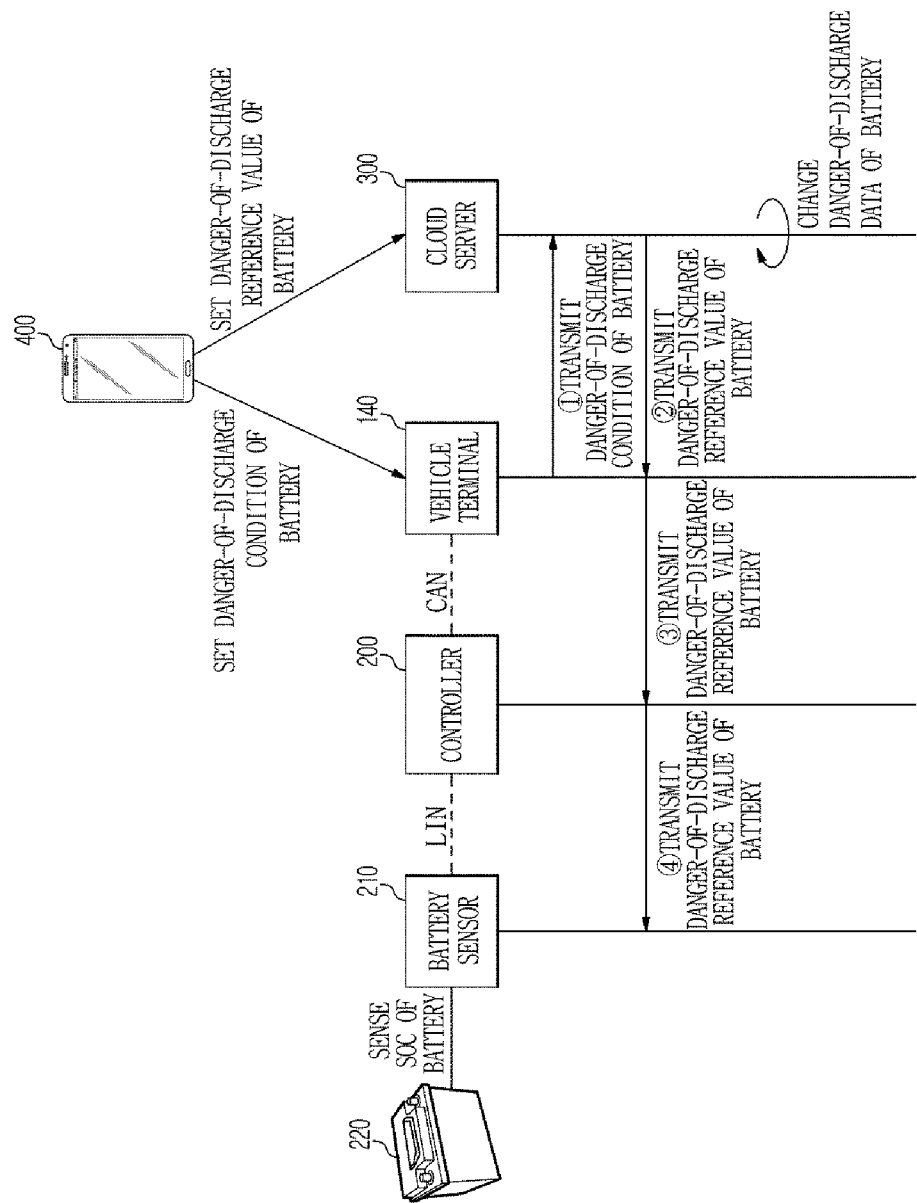
FIGS. 4 and 5 show control flow for a method for sensing a danger-of-battery discharge in a vehicle and a cloud server according to embodiments of the present disclosure.
Figure 5:
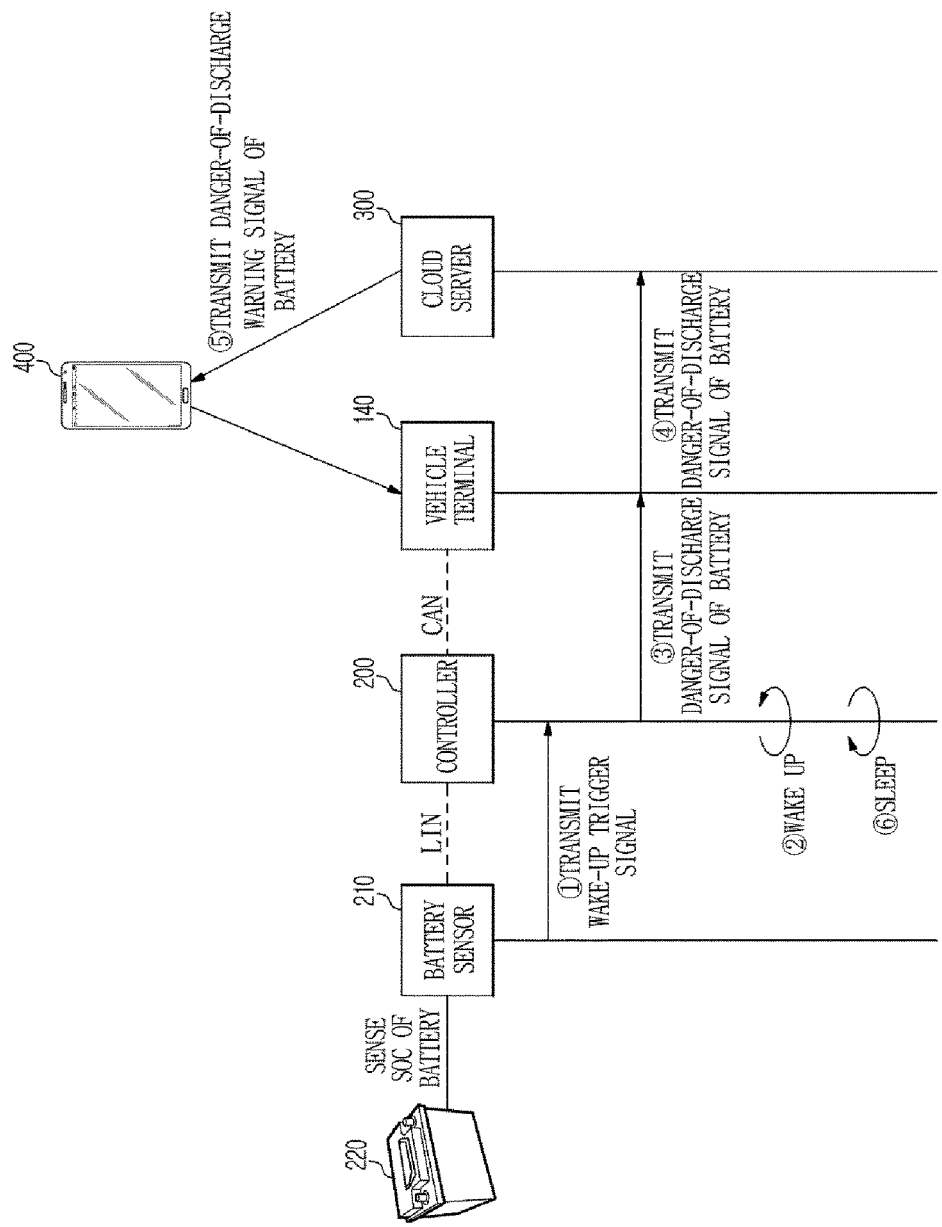
Figure 6:
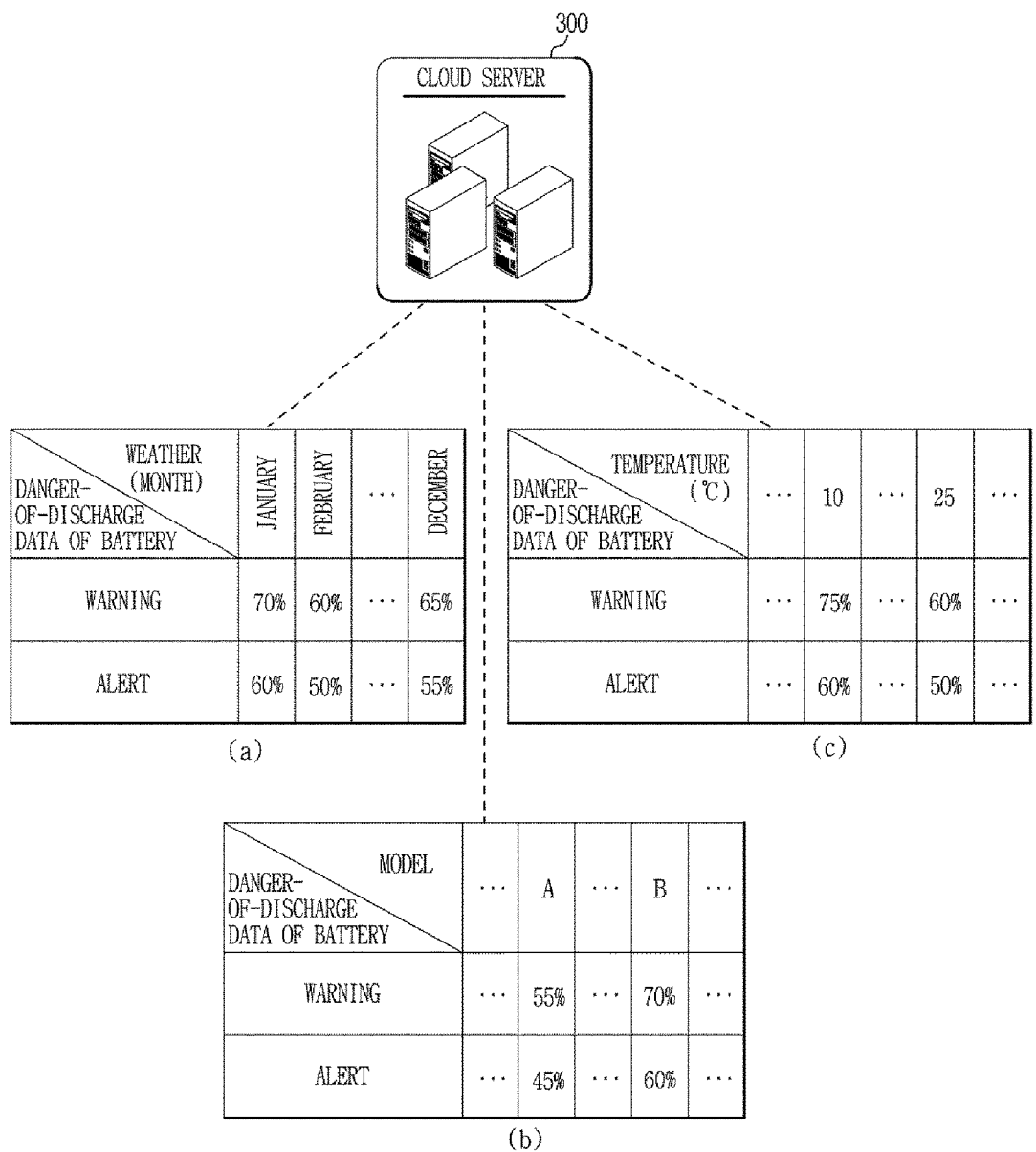
FIG. 6 shows data tables for changing predetermined danger-of-discharge data of a vehicle battery in a cloud server, according to embodiments of the present disclosure.
Figure 7:
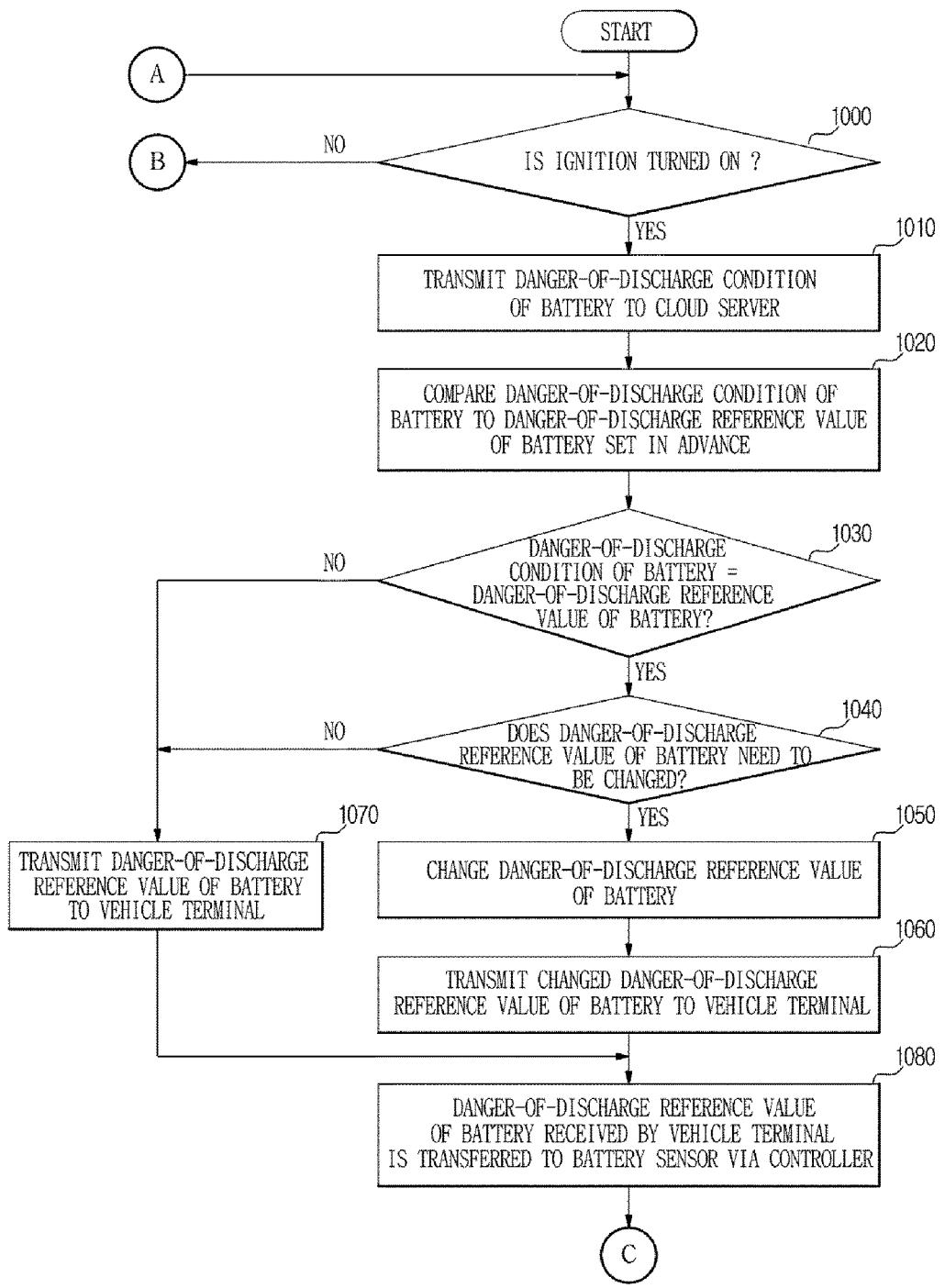
FIGS. 7 and 8 are flowcharts illustrating a method of controlling a vehicle to operate in connection to a cloud server according to embodiments of the present disclosure.
Figure 8:
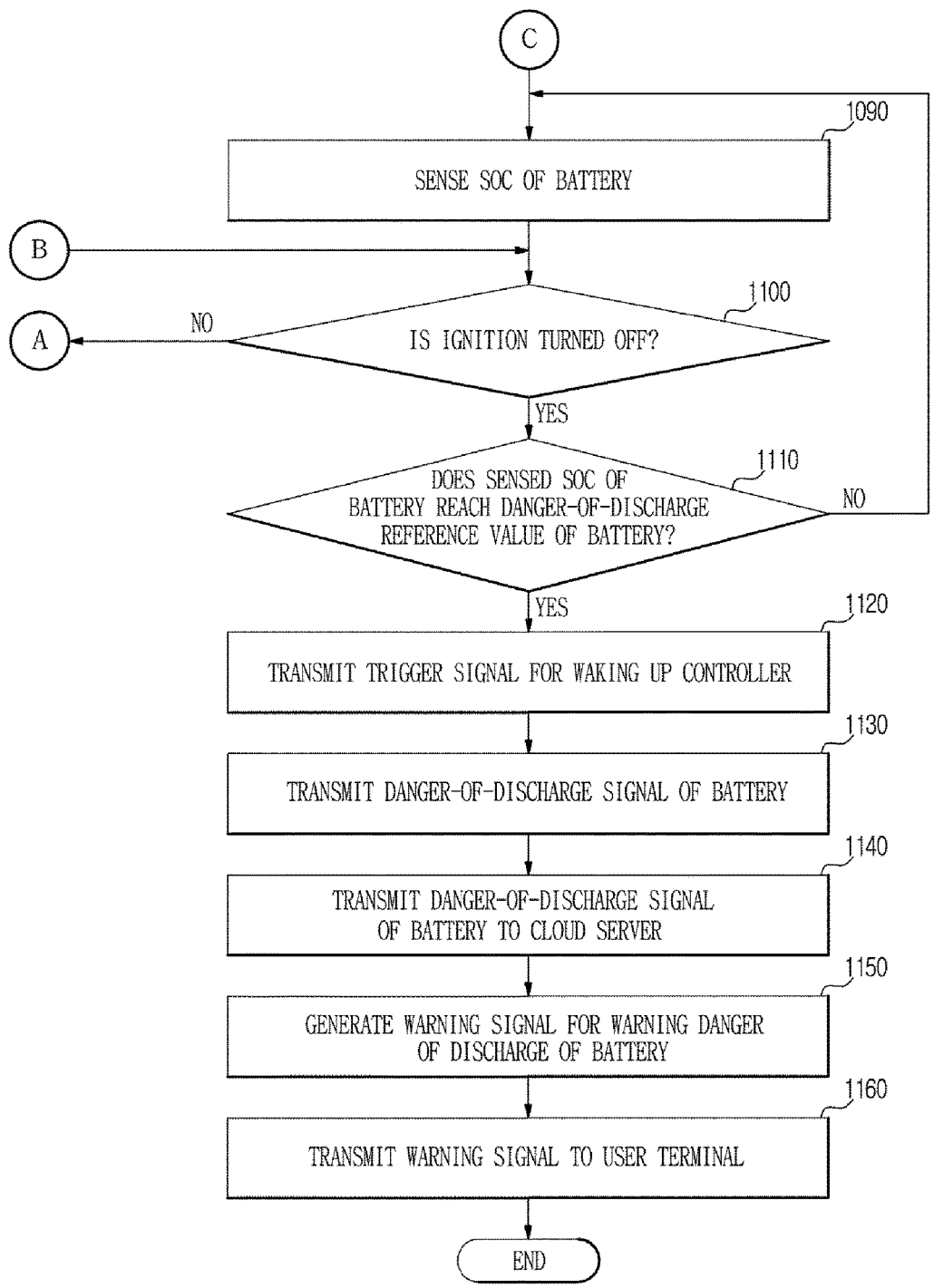

It should be appreciated that the interior of the vehicle 1, including components thereof, as illustrated in FIG. 2 and described above is provided merely for demonstration purposes, and should not be treated as limiting the scope of the disclosure thereto FIG. 3 is a control block diagram of a vehicle and a cloud server according to embodiments of the present disclosure. FIGS. 4 and 5 show control flow for a method for sensing a danger-of-battery discharge in a vehicle and a cloud server according to embodiments of the present disclosure. FIG. 6 shows data tables for changing predetermined danger-of-discharge data of a vehicle battery in a cloud server, according to embodiments of the present disclosure. FIGS. 7 and 8 are flowcharts illustrating a method of controlling a vehicle to operate in connection to a cloud server according embodiments of the present disclosure.

Referring first to FIG. 3, the vehicle 1 according to an embodiment may include a vehicle terminal 140 to collect information relating to an operation and state of the vehicle 1 and to transmit the information relating to the operation and state of the vehicle 1, a vehicle communication device 150 to perform communication between electronic devices installed in the vehicle 1 and communication with an external device, a controller 200 to control individual components of the vehicle 1, a battery sensor 210 to sense a State Of Charge (SOC) of a battery 220, and a storage device 230 to store data that is used to control the vehicle 1.

The vehicle terminal 140 may collect information relating to an operation and state of the vehicle 1, and transmit the collected information relating to the operation and state of the vehicle 1 to an external device, such as a cloud server 300 or a user terminal 400. Also, the vehicle terminal 140 may perform Controller Area Network (CAN) communication with the controller 200, and transfer a danger-of-discharge reference value of the battery 220 received from the cloud server 300 to the controller 200.

The vehicle communication device 150 may function to communicate between the individual components included in the vehicle 1 and the external device such as the cloud server 300 or the user terminal 400. That is, the vehicle communication device 150 may receive a danger-of-discharge reference value of the battery 220 from the cloud server 300, and transmit a danger-of-discharge signal of the battery 220 transmitted from the controller 200 to the cloud server 300.

In order to control various electric loads installed in the vehicle 1 and perform communication between the various electric loads, a communication network including a body network, a multimedia network, a chassis network, etc. may be configured in the vehicle 1, and the separated networks may be connected to one another by the controller 200 in order to transmit/receive CAN communication messages to/from one another.

The battery sensor 210 may monitor a State Of Charge (SOC) of the battery 220 to supply power to the vehicle 1, a State Of Health (SOH) of the battery 220, and a State Of Function (SOF) of the battery 220.

Battery state information, such as a voltage, current, SOC, SOF, and temperature, monitored by the battery sensor 210 may be transferred to the controller 200 through Local Interconnect Network (LIN) communication.

The SOC represents how different a current state of the battery 220 is from a fully charged state of the battery 220, and the SOH represents how different the battery 220 is from a new battery.

The SOF represents how the performance of the battery 220 meets actual requirements when it is used, and accordingly, the SOF may be decided by SOC, SOH, battery operating temperature, and charge/discharge history.

Also, the battery sensor 210 may sense a SOC of the battery 220, and when the battery 220 is at a risk of being discharged, the battery sensor 210 may transmit a trigger signal for waking up the controller 200.

The controller 200 may function to generate control signals for controlling the individual components of the vehicle 1, and to transmit the control signals. The controller 200 may be configured with a Body Control Module (BCM)/Engine Management System (EMS) and electric load controllers, and may be a Telematics Unit (TMU) for controlling operations of the vehicle 1.

The storage device 230 may store data related to a SOC of the battery 220 of the vehicle 1. That is, the storage device 230 may store data of a danger-of-discharge reference value of the battery 220 received from the cloud server 300, and data relating to a danger-of-discharge condition of the battery 220. The danger-of-discharge condition of the battery 220 may have been set in advance by a user, or may have been decided in advance when the vehicle 1 or the battery 220 was manufactured.

The storage device 230 may be implemented as non-volatile memory (e.g., Read Only Memory (ROM), Programmable Read Only Memory (PROM), Erasable Programmable Read Only Memory (EPROM), and flash memory), volatile memory (e.g., Random Access Memory (RAM)), or a storage medium, such as a hard disk and an optical disk, although the storage device 230 is not limited thereto. Also, the storage device 230 may be removably attached on the vehicle 1. For example, the storage device 230 may include a Compact Flash (CF) card, a Secure Digital (SD) card, a Smart Media (SM) card, a Multimedia Card (MMC), or a memory stick, although not limited thereto. Furthermore, the storage device 230 may be provided outside the vehicle 1, and transmit/receive data to/from the vehicle 1 in a wired/wireless fashion.

When the vehicle 1 starts and when the vehicle 1 enters ignition, the controller 200 may request the battery sensor 210 to send information indicating current, a voltage, SOC, SOF, and temperature through LIN communication. Accordingly, the battery sensor 210 may monitor information of current, a voltage, SOC, SOF, and temperature, and transfer the results of the monitoring to the controller 200. The information may be the same as information that is monitored by typical battery sensors.

When the ignition of the vehicle 1 is turned off and when the vehicle 1 enters a parking mode, the controller 200 may request the battery sensor 210 to send information of current and SOC through LIN communication in order to enhance a function of blocking dark current. Accordingly, the battery sensor 210 may monitor information of current and SOC, and transfer the results of the monitoring to the controller 200. Thereafter, the battery sensor 210 may monitor a dark current value and SOC, and then transfer a trigger signal for waking up the controller 200 to the controller 200 when the result of the monitoring reaches a predetermined value, so that the controller 200 can perform a function of blocking dark current.

Referring next to FIGS. 4 and 7, if the ignition of the vehicle 1 is in a turned-on state in operation 1000, the vehicle terminal 140 may transmit a danger-of-discharge condition of the battery 220 to the cloud server 300 through the vehicle communication device 150, in operation 1010.

The danger-of-discharge condition of the battery 220 may have been set by a user and stored, or may be data received in advance from the cloud server 300. That is, the danger-of-discharge condition of the battery 220 may be a condition set to warn a driver or a user, for example, when a charged amount of the battery 220 falls to 50%, in order to prevent the battery 220 from being discharged.

The battery sensor 210 may monitor a SOC of the battery 220 in real time, and if the controller 200 determines that the SOC of the battery 220 reaches a predetermined danger-of-discharge condition, the controller 200 may transmit a danger-of-discharge signal.

The cloud server 300 may include server memory 330 to store predetermined data indicating a danger-of-discharge reference value of the battery 220 of the vehicle 1, a server communication device 310 to receive a danger-of-discharge condition set in the vehicle 1 from the vehicle terminal 140, and a processor 320 to change data indicating the danger-of-discharge reference value of the battery 220, and to generate a control signal for transmitting the data indicating the danger-of-discharge reference value of the battery 220 to the vehicle terminal 140.

The cloud server 300 may be a Car Ubiquitous System Center (CUbiS) or a Telematics Service Center.

As shown in FIG. 4, the cloud server 300 may receive a danger-of-discharge condition of the battery 220 set in the vehicle 1 from the vehicle terminal 140 through the server communication device 310. The processor 320 may compare the received danger-of-discharge condition of the battery 220 to the danger-of-discharge reference value of the battery 220 set in advance, based on the data indicating the danger-of-discharge reference value of the battery 220 stored in advance in the server memory 330, in operation 1020.

If the processor 320 determines in operation 1030 that the danger-of-discharge condition of the battery 220 is different from the danger-of-discharge reference value of the battery 220, the processor 320 may generate a control signal for transmitting the data indicating the danger-of-discharge reference value of the battery 220 stored in the server memory 330 to the vehicle terminal 140 through the server communication device 310. The server communication device 310 may transmit the danger-of-discharge reference value of the battery 220 to the vehicle terminal 140 based on the control signal generated by the processor 320, in operation 1070.

That is, if the danger-of-discharge condition of the battery 220 received from the vehicle terminal 140 is 70%, and the danger-of-discharge reference value of the battery 220 stored in the server memory 330 is 60%, the server communication device 310 may transmit data indicating the danger-of-discharge reference value 60% of the battery 220 to the vehicle terminal 140.

Since the data indicating the danger-of-discharge reference value of the battery 220 updated in the cloud server 300 has high reliability although the danger-of-discharge condition of the battery 220 stored in the vehicle terminal 140 is 70%, the data indicating the danger-of-discharge reference value of the battery 220 stored in the cloud server 300 may be preferentially transmitted to the vehicle terminal 140.

That is, if data relating to the danger-of-discharge condition of the battery 220 stored in advance in the vehicle terminal 140 is different from the danger-of-discharge reference value of the battery 220 received from the cloud server 300, the vehicle terminal 140 may transfer the danger-of-discharge reference value of the battery 220 received from the cloud server 300 to the controller 200.

The danger-of-discharge reference value of the battery 220 received from the cloud server 300 and transferred to the controller 200 may be transferred to the battery sensor 210, in operation 1080. The battery sensor 210 may sense a SOC of the battery 220 based on the danger-of-discharge reference value, and if the battery sensor 210 determines that the SOC of the battery 220 reaches (i.e., is greater than or equal to) the danger-of-discharge reference value of the battery 220, the battery sensor 210 may transmit a trigger signal for waking up the controller 200 to the controller 200.

If the processor 320 determines in operation 1030 that the danger-of-discharge condition of the battery 220 is identical to the danger-of-discharge reference value of the battery 220, the processor 320 may determine whether the danger-of-discharge reference value of the battery 220 stored in the cloud server 300 needs to be changed, in operation 1040.

If the processor 320 determines that the danger-of-discharge reference value of the battery 220 stored in the cloud server 300 needs to be changed, the processor 320 of the cloud server 300 may change the predetermined data indicating the danger-of-discharge reference value of the battery 220 of the vehicle 1, in operation 1050. That is, the cloud server 300 may change the danger-of-discharge data of the battery 220 set in advance and stored in the server memory 330, based on a predetermined condition for changing a danger-of-discharge reference value of the battery 220.

That is, as described above, the danger-of-discharge data of the battery 220 stored in the cloud server 300 may be changed and updated in real time.

The SOC of the battery 220 installed in the vehicle 1 may change according to the characteristics of the battery 220, a surrounding environment where the battery 220 is located, a driving pattern of a driver who drives the vehicle 1, etc. Accordingly, the processor 320 of the cloud server 300 may need to change danger-of-discharge data of the battery 220 in consideration of external factors that may change the SOC of the battery 220.

More specifically, a condition for changing a danger-of-discharge reference value of the battery 220 of the vehicle 1 may include at least one among information of a region where the vehicle 1 is located, weather of the region where the vehicle 1 is located, temperature, the model of the vehicle 1, the kind of the battery 220, and a driving pattern of a driver who drives the vehicle 1. Also, there may be various factors other than the above-described condition for changing the danger-of-discharge reference value, and a condition for changing a danger-of-discharge reference value of the battery 220, stored in the server memory 330 of the cloud server 300, may be changed or added according to a user's setting.

Referring now to FIG. 6, data tables for changing predetermined danger-of-discharge data of the battery 220 of the vehicle 1 in the cloud server 300 are shown.

As shown in (a) of FIG. 6, data representing a relationship between danger-of-discharge data of the battery 220 and weather or months may be stored in the server memory 330 of the cloud server 300.

For example, a danger of discharge of the battery 220 when the vehicle 1 operates in January may be different from a danger of discharge of the battery 220 when the vehicle 1 operates in February. Accordingly, the cloud server 300 may need to change a danger-of-discharge reference value depending on when the vehicle 1 operates.

If data indicating a danger-of-discharge reference value of the battery 220 stored in the server memory 330 of the cloud server 300 corresponds to January when the vehicle 1 operates in February, and the battery sensor 210 of the vehicle 1 senses a SOC of the battery 220 based on the data indicating the danger-of-discharge reference value, the processor 320 of the cloud server 300 may change the danger-of-discharge reference value of the battery 220 to data corresponding to February.

That is, based on the data indicating the danger-of-discharge reference value of the battery 220 corresponding to January, a warning may be issued to a user when a charged amount of the battery 220 falls to 70%, and an alert may be issued to the user when a charged amount of the battery 220 falls to 60%.

The cloud server 300 may change the danger-of-discharge reference value of the battery 220 to data corresponding to February, and based on the changed data, a warning may be issued to the user when a charged amount of the battery 220 falls to 60%, and an alert may be issued to the user when a charged amount of the battery 220 falls to 50%.

The processor 320 of the cloud server 300 may transmit data indicating the danger-of-discharge reference value of the battery 220 changed based on weather or month to the vehicle terminal 140 through the server communication device 310, in operation 1060, and the battery sensor 210 may sense a SOC of the battery 220 based on the changed danger-of-discharge reference value of the battery 220.

As shown in (b) of FIG. 6, data representing a relationship between danger-of-discharge data of the battery 220 and the models of the vehicle 1 may be stored in the server memory 330 of the cloud server 300.

For example, a danger of discharge of the battery 220 when the vehicle 1 is a model A may be different from a danger of discharge of the battery 220 when the vehicle 1 is a model B. Accordingly, the cloud server 300 may need to change a danger-of-discharge reference value of the battery 220 depending on the model of the vehicle 1 operating currently.

If data indicating a danger-of-discharge reference value of the battery 220 stored in the server memory 330 of the cloud server 300 corresponds to the model B when the vehicle 1 operating currently is the model A, and the battery sensor 210 of the vehicle 1 senses a SOC of the battery 220 based on the data indicating the danger-of-discharge reference value, the processor 320 of the cloud server 300 may change the danger-of-discharge reference value of the battery 220 to data corresponding to when the vehicle 1 is the model A.

That is, based on the data indicating the danger-of-discharge reference value of the battery 220 corresponding to the model B, a warning may be issued to a user when a charged amount of the battery 220 falls to 70%, and an alert may be issued to the user when a charged amount of the battery 220 falls to 60%.

The cloud server 300 may change the danger-of-discharge reference value of the battery 220 to data corresponding to the model A, and based on the changed data, a warning may be issued to the user when a charged amount of the battery 220 falls to 55%, and an alert may be issued to the user when a charged amount of the battery 220 falls to 45%.

The processor 320 of the cloud server 300 may transmit data indicating the danger-of-discharge reference value of the battery 220 changed based on the model of the vehicle 1 to the vehicle terminal 140 through the server communication device 310, in operation 1060, and the battery sensor 210 may sense a SOC of the battery 220 based on the changed danger-of-discharge reference value of the battery 220.

As shown in (c) of FIG. 6, data representing a relationship between danger-of-discharge data of the battery 220 and temperature (° C.) may be stored in the server memory 330 of the cloud server 300.

For example, a danger of discharge of the battery 220 when the vehicle 1 operates at temperature of 10° C. may be different from a danger of discharge of the battery 220 when the vehicle 1 operates at temperature of 25° C., wherein the temperature at which the vehicle 1 operates may be outside temperature or inside temperature. Accordingly, the cloud server 300 may need to change a danger-of-discharge reference value of the battery 220 according to temperature at which the vehicle 1 operates.

If data indicating a danger-of-discharge reference value of the battery 220 stored in the server memory 330 of the cloud server 300 corresponds to 25° C. when the vehicle 1 operates at temperature of 10° C., and the battery sensor 210 of the vehicle 1 senses a SOC of the battery 220 based on the data indicating the danger-of-discharge reference value, the processor 320 of the cloud server 300 may change the danger-of-discharge reference value of the battery 220 to data corresponding to the temperature of 10° C.

That is, based on the data indicating the danger-of-discharge reference value of the battery 220 corresponding to the temperature of 25° C., a warning may be issued to the user when a charged amount of the battery 220 falls to 60%, and an alert may be issued to the user when a charged amount of the battery 220 falls to 50%.

The cloud server 300 may change the danger-of-discharge reference value of the battery 220 to data corresponding to the temperature of 10° C., and based on the changed data, a warning may be issued to the user when a charged amount of the battery 220 falls to 75%, and an alert may be issued to the user when a charged amount of the battery 220 falls to 60%.

The processor 320 of the cloud server 300 may transmit data indicating the danger-of-discharge reference value of the battery 220 changed based on temperature to the vehicle terminal 140 through the server communication device 310, in operation 1060, and the battery sensor 210 may sense a SOC of the battery 220 based on the changed danger-of-discharge reference value of the battery 220.

Also, although not shown in the drawings, when the processor 320 of the cloud server 300 receives a danger-of-discharge signal of the battery 220 of the vehicle 1 more than a predetermined number of times from the vehicle terminal 140, the processor 320 may change predetermined discharge warning data of the battery 220 of the vehicle 1, in operation 1050.

Since that the processor 320 of the cloud server 300 receives a danger-of-discharge signal of the battery 220 of the vehicle 1 more than a predetermined number of times from the vehicle terminal 140 means that a SOC of the battery 220 sensed by the battery sensor 210 of the vehicle 1 frequently reaches (i.e., is greater than or equal to) a danger-of-discharge reference value of the battery 220, the processor 320 of the cloud server 300 may need to change a danger-of-discharge reference value of the battery 220 to a smaller value.

That is, the battery sensor 210 may sense a SOC of the battery 220 based on the danger-of-discharge reference value of the battery 220 changed to a smaller value, and if the sensed SOC of the battery 220 is greater than or equal to the danger-of-discharge reference value, the battery sensor 220 may transmit a trigger signal for waking up the controller 200.

Referring now to FIG. 4, the cloud server 300 may transmit the danger-of-discharge reference value of the battery 220 to the vehicle terminal 140 through the server communication device 310. The danger-of-discharge reference value of the battery 220 to be transmitted may be a pre-stored value, or a value changed by the processor 320.

The danger-of-discharge reference value of the battery 220 transferred to the vehicle terminal 140 may be transferred to the battery sensor 210 through the controller 200, and the battery sensor 210 may sense a SOC of the battery 220 based on the danger-of-discharge reference value of the battery 220.

Referring now to FIGS. 5 and 8, when the ignition of the vehicle 1 is in a turned-off state in operation 1100, a SOC of the battery 220 sensed by the battery sensor 210 may reach a danger-of-discharge reference value of the battery 220, in operation 1110. In this case, the battery sensor 210 may transmit a trigger signal for waking up the controller 200, in operation 1120.

That is, the controller 200 may need not to always operate to control sensing of a danger of discharge of the battery 220 of the vehicle 1. That is, the controller 200 may be turned off when the ignition of the vehicle 1 is turned off.

The controller 200 in the turned-off state can wake up by a wake-up signal transmitted from the battery sensor 210, resulting in a reduction of unnecessary power consumption.

Also, the vehicle terminal 140 may be turned off when the ignition of the vehicle 1 is turned off, and turned on when the controller 200 wakes up.

The controller 200 which has woken up may transmit a danger-of-discharge signal of the battery 220 based on a SOC of the battery 220 sensed by the battery sensor 210, in operation 1130.

The danger-of-discharge signal of the battery 220 transmitted from the controller 200 may be transferred to the vehicle terminal 140, and the vehicle terminal 140 may transmit the danger-of-discharge signal of the battery 220 to the cloud server 300 through the vehicle communication device 150, in operation 1140.

The cloud server 300 may receive a danger-of-discharge signal of the battery 220 through the sever communication device 310, and the processor 320 may generate a control signal for warning a danger of discharge of the battery 220 of the vehicle 1 based on the danger-of-discharge signal of the battery 220, in operation 1150.

The control signal for warning a danger of discharge of the battery 220, generated by the processor 320, may be transmitted to the user terminal 400 through the server communication device 310 so as to inform the user that a current SOC of the battery 220 of the vehicle 1 is at a risk of discharge, in operation 1160.

As described above, the cloud server 300 may transmit a danger-of-discharge warning signal of the battery 220 to the user terminal 400. However, the vehicle terminal 140 may transmit a danger-of-discharge warning signal of the battery 220 to the user terminal 400 through the vehicle communication device 150.

If the danger-of-discharge warning signal of the battery 220 is transferred to the user terminal 140, the controller 200 in the wake-up state may be again turned off to become a sleep state.

By sensing a SOC of the battery of the vehicle, and waking up the controller when the SOC of the battery reaches (i.e., is greater than or equal to) a danger-of-discharge reference value, it is possible to transmit a danger-of-discharge signal of the battery although the controller does not operate in real time.

Also, since the cloud server communicating with the vehicle changes danger-of-discharge data of the battery of the vehicle in consideration of weather, temperature, etc., it is possible to set a danger-of-discharge reference value of the battery to an optimal value.

Although select embodiments of the present disclosure have been shown and described hereinabove, it would be appreciated by those skilled in the art that changes may be made in these embodiments without departing from the principles and spirit of the disclosure, the scope of which is defined in the claims and their equivalents.

What is claimed is:

1. A vehicle comprising:
   a battery configured to supply power to the vehicle;
   a controller configured to transmit a danger-of-discharge signal to a cloud server when a danger-of-discharge condition of the battery is satisfied;
   a vehicle terminal configured to receive a danger-of-discharge reference value of the battery from the cloud server, and to transfer the danger-of-discharge reference value to the controller; and
   a battery sensor configured to sense a State-Of-Charge (SOC) of the battery, and to transmit a trigger signal for waking up the controller when the SOC of the battery is greater than or equal to the danger-of-discharge reference value of the battery.

2. The vehicle according to claim 1, wherein the controller is turned off when an ignition of the vehicle is turned off, and the controller wakes up in response to receiving the trigger signal.

3. The vehicle according to claim 1, wherein the controller transmits the danger-of-discharge reference value of the battery received from the vehicle terminal to the battery sensor.

4. The vehicle according to claim 1, wherein, when the controller wakes up in response to receiving the trigger signal, the controller determines whether to transmit the danger-of-discharge signal to the vehicle terminal based on the SOC of the battery sensed by the battery sensor.

5. The vehicle according to claim 1, wherein the vehicle terminal is turned off when an ignition of the vehicle is turned off, and the vehicle terminal is turned on when the controller wakes up in response to receiving the trigger signal.

6. The vehicle according to claim 1, wherein the vehicle terminal transmits the danger-of-discharge signal to the cloud server after receiving the danger-of-discharge signal from the controller.

7. The vehicle according to claim 1, wherein the vehicle terminal stores predetermined data relating to the danger-of-discharge condition of the battery.

8. The vehicle according to claim 7, wherein, when the predetermined data relating to the danger-of-discharge condition of the battery is different from the danger-of-discharge reference value of the battery, the vehicle terminal transmits the danger-of-discharge reference value of the battery to the controller after receiving the danger-of-discharge reference value of the battery from the cloud server.

9. The vehicle according to claim 1, further comprising a vehicle communication device configured to receive the danger-of-discharge reference value of the battery from the cloud server, and to transmit the danger-of-discharge signal to the cloud server after receiving the danger-of-discharge signal from the controller.

10. A method of controlling a vehicle, comprising:
sensing a State Of Charge (SOC) of a battery of the vehicle using a battery sensor;
receiving a danger-of-discharge reference value of the battery at a vehicle terminal from a cloud server;
transmitting a trigger signal from the battery sensor for waking up a controller when the SOC of the battery is greater than or equal to the danger-of-discharge reference value of the battery; and
transmitting a danger-of-discharge signal from the controller to a cloud server when a danger-of-discharge condition of the battery is satisfied.

11. The method according to claim 10, further comprising:
turning off the controller when an ignition of the vehicle is turned off; and
waking up the controller in response to receiving the trigger signal.

12. The method according to claim 10, wherein the receiving of the danger-of-discharge reference value of the battery from the cloud server comprises:
receiving the danger-of-discharge reference value of the battery at the vehicle terminal from the cloud server; and
transmitting the danger-of-discharge reference value of the battery from the vehicle terminal to the controller.

13. The method according to claim 12, further comprising:
transmitting the danger-of-discharge reference value of the battery from the controller to the battery sensor after receiving the danger-of-discharge reference value of the battery from the vehicle terminal.

14. The method according to claim 12, wherein the transmitting of the danger-of-discharge signal comprises:
transmitting the danger-of-discharge signal from the cloud server to the vehicle terminal after receiving the danger-of-discharge signal from the controller.

15. The method according to claim 12, further comprising:
turning off the vehicle terminal when an ignition of the vehicle is turned off; and
turning on the vehicle terminal when the controller wakes up in response to receiving the trigger signal.

16. The method according to claim 10, further comprising:
storing predetermined data relating to the danger-of-discharge condition of the battery.

17. The method according to claim 16, further comprising:
when the predetermined data relating to the danger-of-discharge condition of the battery is different from the danger-of-discharge reference value of the battery, transmitting the danger-of-discharge reference value of the battery to the controller after receiving the danger-of-discharge reference value of the battery from the cloud server.

18. A cloud server comprising:
a server memory configured to store predetermined data indicating a danger-of-discharge reference value of a battery of a vehicle;
a server communication device configured to receive a danger-of-discharge condition of the battery from a vehicle terminal; and
a processor configured to compare predetermined data indicating a danger-of-discharge reference value of the battery with the danger-of-discharge condition of the battery received from the vehicle terminal, and to generate a control signal for transmitting the predetermined data indicating the danger-of-discharge reference value of the battery stored in the server memory to the vehicle terminal when the predetermined data indicating the danger-of-discharge reference value of the battery is different from the danger-of-discharge condition of the battery.

19. The cloud server according to claim 18, wherein the server communication device receives a danger-of-discharge signal from the vehicle terminal when the danger-of-discharge condition of the battery is satisfied.

20. The cloud server according to claim 19, wherein the server communication device receives predetermined data relating to the danger-of-discharge condition of the battery from a user terminal.

21. The cloud server according to claim 20, wherein:
the processor generates a control signal for warning of danger of discharge of the battery in response to the server communication device receiving a danger-of-discharge signal, and
the server communication device transmits the control signal for warning of danger of discharge of the battery to the user terminal.

22. The cloud server according to claim 18, wherein the processor changes the predetermined data indicating the danger-of-discharge reference value of the vehicle battery, and stores the changed data in the server memory.

23. The cloud server according to claim 22, wherein:
the processor changes the predetermined data indicating the danger-of-discharge reference value of the battery based on a condition for changing the danger-of-discharge reference value of the battery, and
the condition for changing the danger-of-discharge reference value of the vehicle battery relates to at least one of: a region where the vehicle is located, weather of the region where the vehicle is located, a temperature of the region where the vehicle is located, a model of the vehicle, a kind of the battery, and a driving pattern of a driver who drives the vehicle.

24. The cloud server according to claim 22, wherein, in response to receiving a danger-of-discharge signal from the vehicle terminal more than a predetermined number of times, the processor changes the predetermined data indicating the danger-of-discharge reference value of the battery.

* * * * *